O. OLSON.
TRACTION WHEEL ATTACHMENT.
APPLICATION FILED MAR. 12, 1912.
1,047,278.
Patented Dec. 17, 1912.
2 SHEETS—SHEET 1.
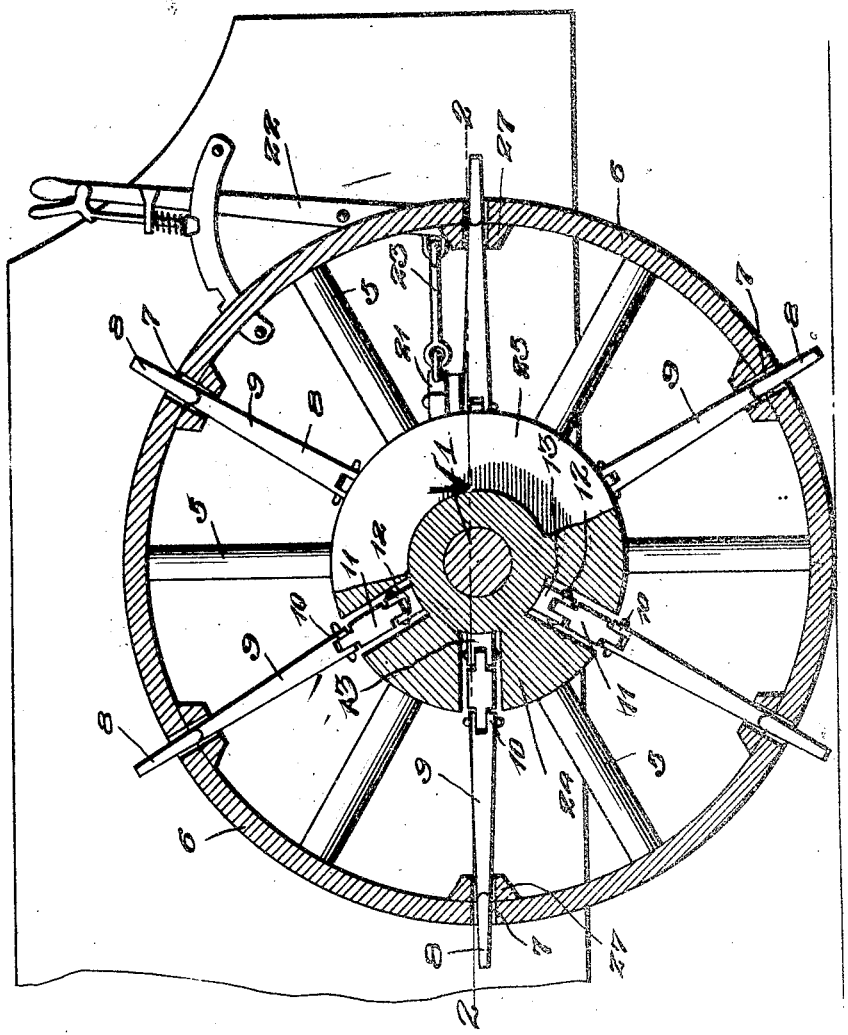
Witnesses
Chas. L. Griesbauer
A. B. Norton.
Inventor
Odin Olson,
By Watson E. Coleman
Attorney O. OLSON.
TRACTION WHEEL ATTACHMENT.
APPLICATION FILED MAR. 12, 1912.
1,047,278.
Patented Dec. 17, 1912.
2 SHEETS—SHEET 2.
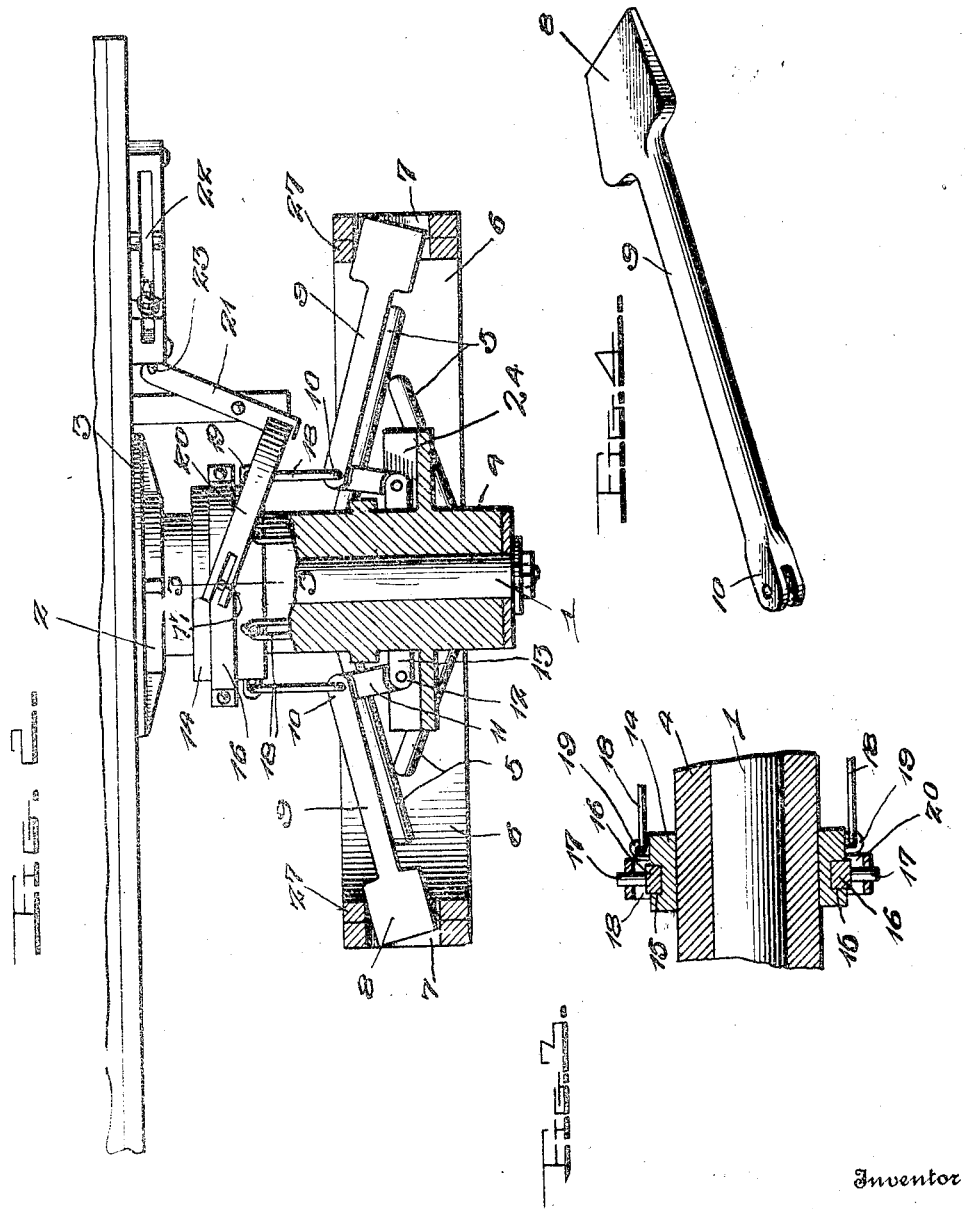
Inventor
Odin Olson,
Witnesses
Chas. L. Griesbauer.
A. B. Norton.
By Watson E. Coleman
Attorney

UNITED STATES PATENT OFFICE.

ODIN OLSON, OF BRAGER, MINNESOTA.

TRACTION-WHEEL ATTACHMENT.

1,047,278.   Specification of Letters Patent.   Patented Dec. 17, 1912.

Application filed March 12, 1912. Serial No. 683,240.

*To all whom it may concern:*

Be it known that I, ODIN OLSON, a subject of the King of Norway, residing at Brager, in the county of Becker and State of Minnesota, have invented certain new and useful Improvements in Traction-Wheel Attachments, of which the following is a specification, reference being had to the accompanying drawings.

This invention relates to new and useful improvements in traction wheels and more particularly to the wheels of machines of this character employed in connection with agricultural machinery; and the object of the invention is to provide means for moving mud hooks out through the rim of the wheel to engage the ground as the wheel is revolved, and thus increase the "grip" when running over certain kinds of soil.

Another object of the invention is to provide a device of this character which will possess advantages in points of efficiency and durability, be inexpensive of manufacture and at the same time be simple in construction and operation.

With the above and other objects in view, the invention consists in the novel features of construction and the combination and arrangement of parts hereinafter fully described, pointed out in the claim and shown in the accompanying drawings, in which—

Figure 1 is a side elevation, with the hub and rim in section, illustrating the construction and operation; Fig. 2 is a transverse sectional elevation of a wheel and a portion of the support with the improvement applied. Fig. 3 is a sectional view on the line 3—3 of Fig. 2. Fig. 4 is a perspective view of one of the movable tractor bars.

This improvement may be attached to any form of wheel to which such devices are applicable; but will generally be applied to the relatively large traction wheels employed upon threshing machines and the like. Referring more particularly to the drawings 1 indicates the axle, which is in the present instance connected by a bracket 2 to the side of the boiler, (indicated at 3). Mounted on the axle is the hub 4 having a plurality of radial spokes 5 projecting therefrom. Secured to the outer ends of the spokes is the rim 6 which is provided with a plurality of elongated openings 7. Movably engaging the openings and adapted for projection therethrough are the enlarged ends 8 of the tractor bars 9, said bars being arranged between the spokes 5. These tractors are employed when running over soft ground where the wheels would be liable to slip unless some such extra gripping means were provided, and as the extra gripping means are required only when running over soft ground and would be very detrimental when running over hard ground means are provided for withdrawing them when not required.

The inner ends of the bars 9 are bifurcated to form spaced ears 10 between which links 11 are pivotally connected, said links being also pivotally mounted between spaced ears 12 formed on the outer ends of the lugs 13 projecting radially from the hub.

Surrounding the hub upon its inner end is a collar 14 which is provided with an annular groove 15 adapted to receive the ring 16, said ring being provided with outwardly projecting studs 17 which are arranged at diametrically opposite points.

Pivotally connected to the collar 14 are laterally projecting links 18 which pivotally connect the tractor bars 9 with the links 11 and also form the operative connections between said bars and links 11 and the collar. In the present instance, the inner ends of these links 18 are connected to eyes 19 which are secured on the outer edge of the collar 14. The collar 14 is mounted to slide upon the hub 4 and be operated by the yoke 20 having its ends mounted on the studs 17, and its intermediate portion connected to the lever 21, said lever being pivotally connected to the ratchet lever 22 by means of the link rod 23. These levers 21 and 22 are supported in any suitable manner.

Segmental spacing blocks 24 are arranged between the lugs 13 and formed on the inner face of a disk 25 mounted on the hub 4. Reinforcing blocks 27 are arranged upon the inner side of the rim of the wheel and are provided with laterally elongated openings adapted to register with the openings 7 in the rim of the wheel. The blocks 27 form guides and wear plates for the enlarged ends 8 of the tractor bars, the blocks thus receiving the strain and preventing undue wear upon the rim of the wheel. The radially disposed side edges of the segmental spacing blocks 24 and the disk 25 tend to protect the jointed parts from being struck and injured, while at the same time the spacing blocks 24 also serve substantially as guiding members should there be any strain on the parts at right angles to the jointed movements thereof, the side edges of adjoining blocks 24 extending parallel to each other and substantially radially and parallel to the lugs 13 and links 11 which connect the lugs to the tractor bars.

When my improved wheel is applied to axles passing entirely through the machine, the operating levers 21 and 22 may be modified to adapt them to the change of structure, and it will be understood that the operating means may be varied to any required extent to adapt the devices to the varying conditions and structural changes found in the different makes of traction engines.

Having thus described the invention what is claimed is:—

The combination with a wheel embodying a hub, spokes and a rim, the rim being formed with openings extending therethrough, of tractor bars movable through said openings, links pivotally connecting the inner ends of the tractor bars to the hub, a laterally movable collar operatively connected to the tractor bars, whereby to move them inwardly and outwardly, means for moving said collar, and a disk secured to the hub on the outer side of the links and tractor bars, said collar being formed on its inner face between the links with segmental spacing blocks, the side edges of which extend substantially parallel to the links and tend to guide the same and protect them from any strain at right angles to the normal jointed movements thereof.

In testimony whereof I hereunto affix my signature in the presence of two witnesses.

ODIN OLSON.

Witnesses:
W. B. CARMAN,
J. L. PRYOR.